(No Model.)

A. W. BYERS & J. C. DORSER.
COTTON PLANTER.

No. 252,732. Patented Jan. 24, 1882.

WITNESSES:
Chas. Nida.
C. Sedgwick

INVENTOR:
A. W. Byers
J. C. Dorser
BY Munn & Co.
ATTORNEYS.

UNITED STATES PATENT OFFICE.

ANTHONY W. BYERS AND JAMES C. DORSER, OF SHERMAN, TEXAS.

COTTON-PLANTER.

SPECIFICATION forming part of Letters Patent No. 252,732, dated January 24, 1882.

Application filed September 10, 1881. (No model.)

*To all whom it may concern:*

Be it known that we, ANTHONY WALTER BYERS and JAMES CARROL DORSER, of Sherman, in the county of Grayson and State of Texas, have invented a new and useful Improvement in Cotton-Planters, of which the following is a specification.

Figure 1:
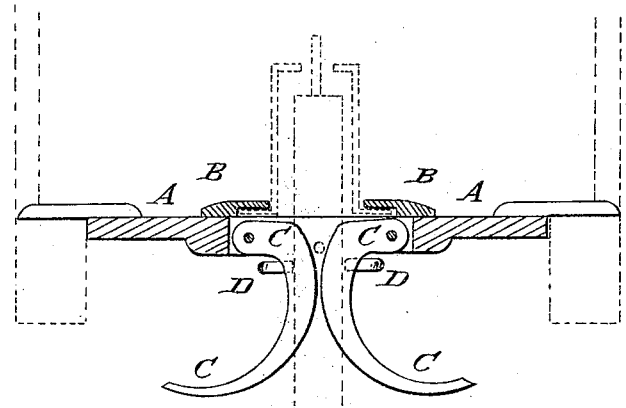
Figure 2:
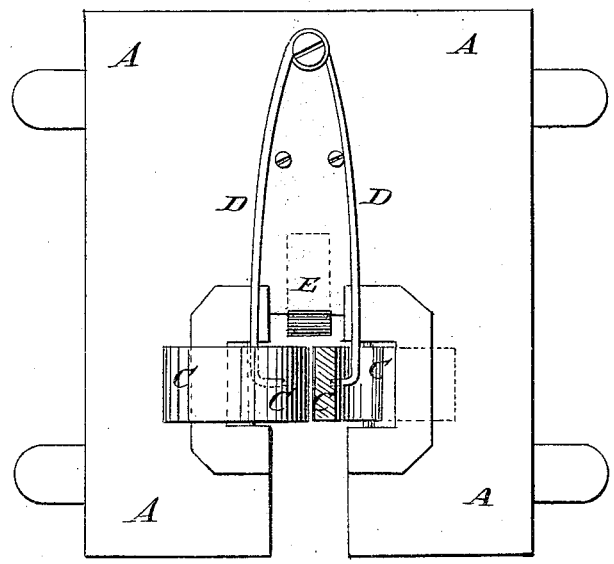

Figure 1 is an elevation of my improvement, the hopper-bottom being shown in section. Fig. 2 is an under side view of the same, one of the cut-offs being shown in cross-section.

Similar letters of reference indicate corresponding parts.

The object of this invention is to improve the construction of the cotton-planters for which Letters Patent No. 233,725 were issued to us October 26, 1880, in such a manner as to make them more reliable in operation.

The invention consists in the combination, with the slotted hopper-bottom, of the hinged and curved cut-offs and their spring, whereby the escape of seed will be prevented, except as forced out by the prongs of the feed-wheel, as will be hereinafter fully described.

A represents the feed plate or hopper-bottom, to which the hopper is secured, and which is secured to the frame of the planter. The bottom A is slotted from its rear end to receive the feed-wheel and has flanged cleats B attached to it at the opposite sides of the said slot to receive the base-flanges of the gage-plates.

In the bottom A, at the opposite sides of the forward end of its slot, are formed recesses or notches to receive the upper ends of the cut-offs C, which are hinged at their said upper ends to the said bottom A. The cut-offs C project inward, and are then curved downward and outward, as shown in Fig. 1, so that their convexed sides may meet, or nearly meet, a little below the bottom A. The upper sides of the upper ends of the cut-offs C are made flat, to rest against the base-flanges of the gage-plates of the planter, as indicated in dotted lines in Fig. 1.

In the upper part of the outer or concaved sides of the cut-offs C are formed recesses to receive the ends of the arms of the spring D, the middle part of which is bent into a coil, and is secured to the forward part of the lower side of the hopper-bottom A, as shown in Fig. 2, so that the tension of the said spring D will press the convexed sides of the cut-offs C toward each other. With this construction, as the prongs of the feed-wheel press the seed down into the space between the upper ends of the cut-offs C, the spring D will yield and allow the said cut-offs to separate enough to allow the seed and the prong to pass through, and will again force the cut-offs together as soon as the said prong has passed, so that the seed will be dropped regularly and will not be dropped in clumps or bunches. To the bottom A, at the forward end of its slot, is secured a spring, E, which passes down through the said slot and is curved forward beneath the said bottom A, to prevent seed from being crushed or clogging the machine by getting between the bottom A at the forward end of its slot and the ends of the prongs of the feed-wheel, the said spring yielding and allowing the seed to pass. The spring E thus serves as a cut-off to prevent any seed from escaping between the forward edges of the cut-offs C and the forward end of the slot in the bottom A.

Having thus fully described our invention, we claim as new and desire to secure by Letters Patent—

In a cotton-planter, the combination, with the slotted hopper-bottom A, of the hinged and curved cut-offs C and the spring D, substantially as herein shown and described, whereby the escape of seed will be prevented except as forced out by the prongs of the feed-wheel, as set forth.

ANTHONY WALTER BYERS.
JAMES CARROL DORSER.

Witnesses:
W. H. RUCKER,
S. O. DOANE.